(No Model.)
C. H. EVANS.
TIRE HEATING DEVICE.
No. 461,095. Patented Oct. 13, 1891.
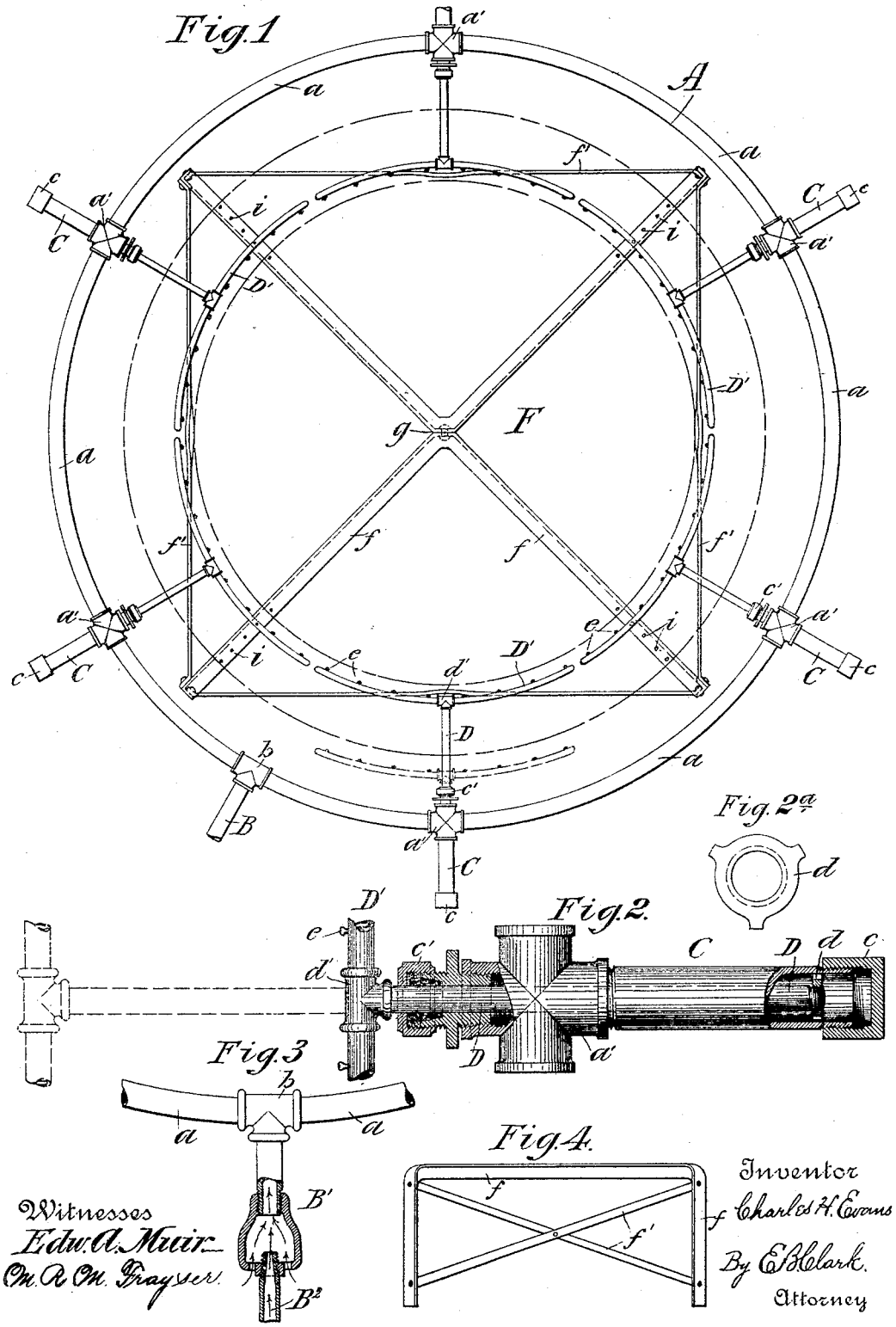

UNITED STATES PATENT OFFICE.

CHARLES H. EVANS, OF CHICAGO, ILLINOIS, ASSIGNOR TO THE FAHNEHJELM INCANDESCENT GAS LIGHT COMPANY, OF SAME PLACE.

TIRE-HEATING DEVICE.

SPECIFICATION forming part of Letters Patent No. 461,095, dated October 13, 1891.

Application filed February 10, 1891. Serial No. 380,915. (No model.)

*To all whom it may concern:*

Be it known that I, CHARLES H. EVANS, a citizen of the United States, residing at Chicago, in the county of Cook and State of Illinois, have invented certain new and useful Improvements in Tire-Heating Devices; and I do hereby declare the following to be a full, clear, and exact description of the invention, such as will enable others skilled in the art to which it appertains to make and use the same.

This invention relates to a circular adjustable gas tire-heating device adapted to heat and expand tires of various sizes by means of either illuminating or fuel gas.

The object of the invention is to provide a simple and quickly-operating device for heating tires by gas-flames.

The matter constituting my invention will be defined in the claims.

I will now particularly describe my invention by reference to the accompanying drawings, in which—

Figure 1 represents a top plan view of the gas-heating device and the angle-iron stand for supporting the tire while being heated. Fig. 2 represents a top plan view, partly in section and on an enlarged scale, of one of the adjustable gas-burner heads with its sheath or socket. Fig. 2$^a$ represents a plan view of a nut used with such burner-head. Fig. 3 represents a plan view, partly in section, of one of the main gas-supply pipes used in my heating device. Fig. 4 represents a side elevation of the stand or truss on reduced scale.

The circular gas-pipe A for supplying the burner-heads is supported at a suitable height above the ground, and is provided with the main supply-pipe B, connected thereto by a T-coupling $b$, having right and left screw-threads. The pipe B is intended for supplying fuel-gas, which is preferably used for heating tires. The circular pipe A is preferably made up of a number of short curved sections of pipe $a$, joined to the cross or X couplings $a'$, forming a part of the burner-heads H. These burner-heads are composed of the tubular sheaths or sockets C, screwed into one branch of the X and having the other end closed by a screw-cap $c$, and of a movable or sliding inner tube D and a curved burner-pipe D'. The branch of the X opposite socket C is provided with a gland $c'$, having a central opening and provided with packing for making a tight joint around the inner pipe D, which is of smaller diameter than the socket C, as shown in Fig. 2.

Pipe D is preferably made of brass, and is provided at its outer end with a lock or stop-nut $d$, which has its peripheral portion cut away, leaving projecting lugs $n$, Fig. 2, so as to provide for the passage of gas through socket C and into tube D. The nut $d$ acts to stop the outward movement of the pipe D by contact with the gland $c'$. The inner end of pipe D is connected by a T-coupling $d'$ to the curved burner-pipe D'. The outer ends of the curved burner-pipes are closed by plugs, which are welded into them, or by any other suitable means, and they are provided along their inner curved sides with lava burner-tips $e$. These burner-tips are preferably about three inches apart, but can be set at any suitable distance, according to the character of the flame which they produce.

Instead of using simply a plain gas-supply pipe B, which is preferred for fuel-gas, I may connect with such pipe a mixing-chamber B', having air-inlet openings in its enlarged outer end and having a connected central jet-nozzle $B^2$ for supplying illuminating gas or any rich hydrocarbon gas or vapor under pressure. As is well understood the jet-nozzle $B^2$, when supplied with gas, will inject air through the openings in chamber B' and force the mixture into the circular pipe A. The mixing-chamber and the jet-nozzle are used when the gas is too rich in hydrocarbons to be economically burned by itself. The air mixed with this gas causes its more perfect combustion and prevents the deposit of smoke or soot on the article heated.

I have found in practice that the circular supply-pipe A and pipe B should be about one inch in diameter and that the circle of pipe A should be about five feet five inches across.

In order to support the tire to be heated I provide a stand or truss F, having four radial bars at the top and four legs at the corners. The top bars $f$ and the legs are formed of two pieces of angle-iron of equal length, and each piece is bent out at about right angles in the middle and then its outer ends are bent at right angles downward to form the legs. The two portions thus formed are joined at the middle by rivet $g$. The legs are connected and strengthened by rods or bars of strap-iron $f'$, which are arranged to cross each other and are riveted to the legs, as shown in Fig. 4. The stand or truss made as described is quite strong and durable and can be cheaply made. The four radial bars at the top are provided near their outer ends with holes $i$, drilled downward for the insertion of pegs or pins to aid in properly centering the tires to be heated. In order to drill the holes arcs should be struck from the center at $g$, with radii of one foot nine inches, one foot eleven inches, two feet one inch, and two feet three inches, and the hole drilled at such points. The stand will be of sufficient size to conveniently support tires ranging from three feet six inches to four feet six inches. For the purpose of heating the various-sized tires the burner-tubes or the curved burner-pipes D' and their supply-pipes D are adjusted out or in within the socket C, as will be readily understood, and the parts can be manipulated by any unskilled workmen. Instead of a screw-threaded nut $d$ applied to the outer end of pipe D, such pipe may be provided simply with outwardly projecting lugs or pins for centering and guiding it in socket C.

Having described my invention, what I claim, and desire to secure by Letters Patent, is—

1. In a tire-heating device, a circular gas-pipe, in combination with adjustable burner-heads, substantially as described.

2. In a tire-heating device, a circular gas-pipe, in combination with adjustable burner-heads having curved burner-pipes and adapted to be moved outward and inward in relation to the circular gas-pipe.

3. In a tire-heating device, the circular gas-pipe, in combination with the burner-heads projecting inwardly therefrom and having curved burner-pipes provided on their inner sides with tips or openings for the gas-flame, substantially as described.

4. In combination with the circular gas-pipe, the burner-heads, each composed of a socket or sheath and an inner sliding pipe having at its inner end a curved burner-pipe, substantially as described.

5. The combination, with the gas-supply pipe, of a socket or sheath closed at its outer end and having a gland with packing at its inner end, and the inner pipe passing through such gland and into the socket and having lugs or pins at its outer end and a curved burner-pipe at its inner end, substantially as described.

6. The circular gas-pipe composed of curved sections connected by X-couplings, in combination with the burner-heads provided with sockets, and an interior sliding pipe having at its outer end a curved burner-pipe, substantially as described.

7. In combination with the circular gas-pipe and burner-heads, the enlarged air-mixing chamber and the gas-supply pipe having a jet-nozzle entering such mixing-chamber, substantially as described.

8. In combination with the circular gas-pipe provided with burner-heads, the stand or truss for supporting the tires, provided with means for centering the tires within the burner-heads, substantially as described.

9. In combination with the tire-heating device, the stand or truss composed of the bent bars of angle-iron forming radial bars or rods at the top and legs at the corners, connected together by brace rods or bars, substantially as described.

In testimony whereof I affix my signature in presence of two witnesses.

CHARLES H. EVANS.

Witnesses:
A. J. HAGEMAN,
F. G. BROWN.